US010536923B2

(12) United States Patent
Chen et al.

(10) Patent No.: US 10,536,923 B2
(45) Date of Patent: Jan. 14, 2020

(54) TWO-DIMENSIONAL ENCOUNTER LOCATION DETECTION

(71) Applicants: Yi Lin Chen, New Taipei (TW); Mi Sun Park, Hillsboro, OR (US); Shao-Wen Yang, San Jose, CA (US); Lei Yang, Hillsboro, OR (US); Intel Corporation, Santa Clara, CA (US)

(72) Inventors: Yi Lin Chen, New Taipei (TW); Mi Sun Park, Hillsboro, OR (US); Shao-Wen Yang, San Jose, CA (US); Lei Yang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/062,103

(22) PCT Filed: Dec. 26, 2015

(86) PCT No.: PCT/US2015/000382
§ 371 (c)(1),
(2) Date: Jun. 13, 2018

(87) PCT Pub. No.: WO2017/111824
PCT Pub. Date: Jun. 29, 2017

(65) Prior Publication Data
US 2019/0007924 A1   Jan. 3, 2019

(51) Int. Cl.
*G01S 5/02* (2010.01)
*H04W 64/00* (2009.01)
(Continued)

(52) U.S. Cl.
CPC ............. *H04W 64/003* (2013.01); *G01S 5/02* (2013.01); *H04W 4/027* (2013.01); *H04W 4/029* (2018.02); *H04W 4/70* (2018.02); *G01S 11/06* (2013.01)

(58) Field of Classification Search
CPC ... H04W 64/003; H04W 4/029; H04W 64/00; H04W 4/027; H04W 4/70; G01S 5/02; G01S 11/06; G01S 1/02
See application file for complete search history.

(56) References Cited

U.S. PATENT DOCUMENTS 9,743,237 B2 * 8/2017 Lee ........................ H04W 4/029
9,781,604 B1 * 10/2017 Shavell ................. H04W 12/12
(Continued)

FOREIGN PATENT DOCUMENTS

WO        2014146233 A1     9/2014

OTHER PUBLICATIONS

International Preliminary Report on Patentability in International Application No. PCT/US2015/000382, dated Jun. 26, 2018, 11 pages.

(Continued)

*Primary Examiner* — Khawar Iqbal
(74) *Attorney, Agent, or Firm* — Alliance IP, LLC

(57) ABSTRACT

Sensors provisioned on a first device detect a movement of the first device corresponding to the first device changing position within an environment. Location information for the first device is updated based on the position change. A plurality of signals are detected, at the first device, from a second device in the environment, determine, and a distance between the first and second devices is determined based on each of the signals. From the signals, another change in position of the first device within the environment is determined and the location information updated for the first device. The movement is detected at the first device at an instance between two of the plurality of signals, and location information for the first device based on the first position change is updated prior to detection of the later of the two signals in the plurality of signals.

23 Claims, 10 Drawing Sheets

(51) Int. Cl.
  *H04W 4/02* (2018.01)
  *H04W 4/70* (2018.01)
  *H04W 4/029* (2018.01)
  *G01S 11/06* (2006.01)

(56) References Cited

U.S. PATENT DOCUMENTS

| | | | | |
|---|---|---|---|---|
| 9,832,615 | B2* | 11/2017 | Palanki | H04W 4/04 |
| 9,913,201 | B1* | 3/2018 | Harmon | H04W 48/04 |
| 9,995,816 | B2* | 6/2018 | Chen | G01S 5/021 |
| 2013/0182697 | A1* | 7/2013 | Tuominen | G01S 5/0242 |
| | | | | 370/338 |
| 2014/0206379 | A1* | 7/2014 | Mayor | H04W 64/003 |
| | | | | 455/456.1 |
| 2014/0235266 | A1* | 8/2014 | Edge | G01S 5/02 |
| | | | | 455/456.1 |
| 2015/0266577 | A1 | 9/2015 | Jones et al. | |
| 2015/0327010 | A1* | 11/2015 | Gottschalk | G06F 17/50 |
| | | | | 455/456.1 |
| 2015/0358778 | A1* | 12/2015 | Heo | H04W 4/029 |
| | | | | 455/456.6 |
| 2015/0365801 | A1 | 12/2015 | Smith et al. | |
| 2016/0216360 | A1* | 7/2016 | Georgy | G01S 19/45 |
| 2016/0316426 | A1* | 10/2016 | Kumar | H04W 52/0206 |
| 2017/0079008 | A1* | 3/2017 | Smith | H04W 4/029 |
| 2017/0161342 | A1* | 6/2017 | Suzuki | G06Q 30/02 |
| 2018/0192241 | A1* | 7/2018 | Jernigan | H04W 4/021 |

OTHER PUBLICATIONS

International Search Report and Written Opinion in International Application No. PCT/US2015/000382, dated Sep. 21, 2016, 13 pages.

* cited by examiner

TWO-DIMENSIONAL ENCOUNTER LOCATION DETECTION

CROSS-REFERENCE TO RELATED APPLICATIONS

This application is a national stage application under 35 U.S.C. § 371 of PCT International Application Serial No. PCT/US2015/000382, filed on Dec. 26, 2015, and entitled TWO-DIMENSIONAL ENCOUNTER LOCATION DETECTION. The disclosure of the prior application is considered part of and is hereby incorporated by reference in its entirety in the disclosure of this application.

TECHNICAL FIELD

This disclosure relates in general to the field of computer systems and, more particularly, to device location tracking.

BACKGROUND

Location-based services are increasing in popularity and value, particularly as marketers realize the value of catering to users' specific interests, tendencies, and proximity within a particular geographical area. To provide such location-based services, it can be a prerequisite to provide functionality for reliably determining the location of a user (or device carried by a user). Location can also be applied in other applications, such as applications aimed at enhancing traditional agriculture, traffic maintenance, robotics, drone and autonomous vehicle tracking, orchestrations, and traffic management, among other examples. Radio frequency technology has been utilized to determine device locations. Global positioning systems (GPS) is one example of a localization system that can be used to derive location information that can be used in one or more graphical user interfaces and location-based services. GPS systems involve space-based antennas that can provide location information to client receivers potentially anywhere having an unobstructed line of sight to four or more GPS satellites, among other example localization systems.

BRIEF DESCRIPTION OF THE DRAWINGS

Like reference numbers and designations in the various drawings indicate like elements.

DETAILED DESCRIPTION OF EXAMPLE EMBODIMENTS

Together with satellite global positioning systems, indoor location technology is a key contributor to delivering location-based services. Radio-based indoor positioning has been a popular approach, enabling robust indoor positioning in some systems. Global positioning systems (GPS) have also enjoyed wide-adoption in personal computing devices (e.g., smartphones, tablets, and in-vehicle computers), providing precise. Despite these advancements, localization within Internet of Things (IoT) systems can remain a challenge, particularly in systems deploying a heterogeneous mix of IoT devices. The capabilities of IoT devices can vary widely. Some devices may be provisioned with high speed processing capabilities, GPS modules, and sophisticated software stacks, while other devices are, by design, more simply provisioned (e.g., with lower power processors, minimal memory, specialized sensors, simplified communication interfaces, etc.). In this sense, some IoT devices can be considered resource-constrained in that their design is focused to include only those features and hardware that allow them to perform their particular function (e.g., as a sensor and/or actuator) and communicate with at least one other device to participate in IoT systems. Accordingly, such resource-constrained devices often do not possess higher-end localization capabilities, nor are they equipped with the infrastructure to support such capabilities (e.g., GPS) without weighing down the original design. Additionally, even when devices possess state of the art GPS and other localization systems, these solutions may perform poorly within certain environments (e.g., certain indoor environments, multi-story environments, etc.). Accordingly, localization systems can be provided that utilize principles of collaborative localization, where multiple devices, operating (and, in some cases, moving) together within an environment can provide reliable localization results for devices within an IoT system. Further, an improved system can be provided to support localization based on two-dimensional (2D) encounter geometry to further improve upon existing localization systems to implement a solution well-tailored for heterogeneous IoT systems.

Figure 1:
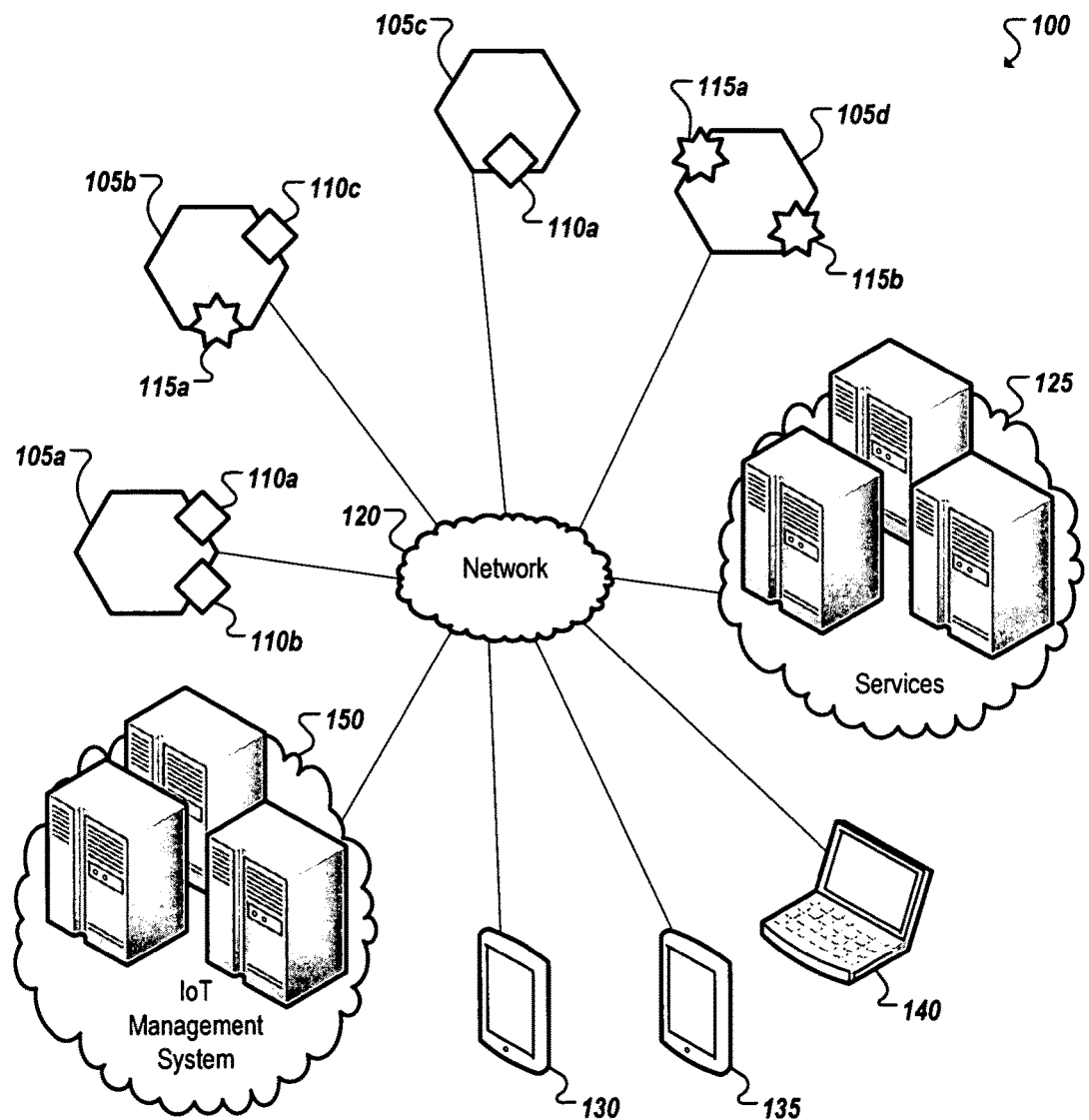
FIG. 1 illustrates an embodiment of a system including devices capable of being deployed within a machine-to-machine (M2M) network, each hosting respective device localization logic.

FIG. 1 is a block diagram illustrating a simplified representation of a system 100 that includes one or more devices 105a-d, or assets, deployed throughout an environment. Each device 105a-d may include a computer processor to execute varying types of programs or other code, as well as communications modules to allow each device 105a-d to intercommunicate and operate with one or more other devices (e.g., 105a-d) or systems in the environment. Such communications modules can include an antennae and receiver, the antennae capable sending signals, which may serve as beacons within a device localization solution. Each device can further include one or more instances of various types of sensors (e.g., 110a-c), actuators (e.g., 115a-b), storage, power, and computer processing resources, which can be leveraged and utilized (e.g., by other devices or software) within a machine-to-machine, or Internet of Things (IoT) system or application.

Sensors configured for use in various M2M and IoT applications, or "application sensors," can be operable to detect, measure, and generate sensor data describing characteristics of the environment in which they reside, are mounted, or are in contact with. For instance, a given application sensor (e.g., 110*a-c*) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, application sensors (e.g., 110*a-c*) as described herein, anticipate the development of a potentially limitless universe of various sensors, each designed to and capable of detecting, and generating corresponding sensor data for, new and known environmental characteristics. Actuators (e.g., 115*a-b*) can allow the device to perform some kind of action to affect its environment. For instance, one or more of the devices (e.g., 105*b, d*) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

As noted above, application sensors 110*a-c* and actuators 115*a-b* provided on devices 105*a-d* can be incorporated in and/or embody an Internet of Things (IoT) or machine-to-machine (M2M) systems. IoT or M2M systems (sometimes used interchangeably herein) can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105*a-d*), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1, multiple IoT devices (e.g., 105*a-d*) can be provided from which IoT systems can be deployed according various IoT software applications. A device (e.g., 105*a-d*) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples.

Some IoT devices may be designed to be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples. The location and changes in location of such devices relative to other devices or the environment in which they operate can be leveraged in some IoT applications. Accordingly, localization logic can be disposed on one or more of the devices (e.g., 105-*a*) in the system and/or a management system (e.g., 150) managing deployment and operation of the system, among other examples.

Continuing with the example of FIG. 1, software-based IoT management platforms (e.g., 150) can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 120) or a mobile app for execution on a smart phone, tablet, smart watch, or other mobile device (e.g., 125, 130). For instance, a management system 150 can provision one or more deployed devices in an IoT system with application code in order to facilitate the IoT system.

In some cases, the application can make use of a dedicated or general purpose management utility or administrative tool allowing users to configure settings and policies to govern how the set of devices (e.g., 105*a-d*) are to operate when deployed in an IoT system. A management utility can also be used to select which devices are used with the application. In other cases, a dedicated IoT management application can be provided which can manage potentially multiple different IoT applications or systems. The IoT management utility, or system, may be hosted on a single system, such as a single server system (e.g., 150) or a single end-user device (e.g., 130, 135, 140). Alternatively, an IoT management system can be distributed across multiple hosting devices (e.g., 130, 135, 140, 150, etc.).

In some cases, applications can be programmed, or otherwise built or configured, utilizing interfaces of an IoT management system. In some cases, the interfaces can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). Further, IoT application systems built using the IoT management system can be sharable, in that a user can send data identifying the built system to another user, allowing the other user to simply port the abstracted system definition to the other user's environment (even when the combination of device models is different from that of the original user's system).

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 125). Such services 125 can also consume data generated from or describing the IoT system. For instance, localization data can be generated (e.g., by individual devices (e.g., 105a-d) and/or the management system 150) and provided to a local or remote server (e.g., 125) of a service that utilizes localization. To provide such interaction, one or more devices (e.g., 105a-d) of an IoT system can connect to a remote service over one or more networks 120. In some cases, a gateway device (or the management system 150) can be utilized to facilitate a network connection (e.g., an Internet connection) to facilitate interaction with a remotely hosted service 125. In some cases, the remote service can, itself, be considered an asset of an IoT application and system. Additionally, data queried from or otherwise received from a remotely-hosted service can be consumed by the governing IoT application and/or one or more of the component IoT devices to cause one or more results or actions to be performed, among other examples.

One or more networks (e.g., 120, 122) can facilitate communication between IoT devices (e.g., 105a-d), end user devices (e.g., 130, 135, 140), and other systems (e.g., 125, 150) utilized to implement and manage IoT applications in an environment. Such networks can include wired and/or wireless local networks, public networks, wide area networks, broadband cellular networks, the Internet, and the like. For instance, in some implementations, one or more gateway devices (e.g., 125) can be utilized to facilitate communication with one or more devices (e.g., 105b-c) within a given IoT system. For instance, a gateway can be utilized to extend the geographical reach of an IoT system implementation, to provide a mechanism to communicate with devices (e.g., 105b) which possess limited or proprietary communications capabilities, or form sub-groups of devices within an IoT system deployment.

In general, "servers," "clients," "computing devices," "network elements," "hosts," "system-type system entities," "user devices," "sensor devices," and "systems" (e.g., 105a-d, 125, 130, 135, 140, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Changing conditions are expected in environments in which positioning solutions are deployed. Some conventional (and emerging) tools utilize RF signal trilateration and other techniques to derive location based on radio signal strength. Such "model-based" approaches may triangulate the position of a given device based on a radio propagation model to estimate the device's (e.g., tag's) distance from known location of beacons, or readers, utilized to triangulate the device and known transmission power of the device. Such systems often involve careful calibration of intrinsic and extrinsic parameters of the beacons.

Indoor localization functionality can be prerequisite to delivering certain location-based services. Multi-modal approaches have been developed for indoor localization leveraging a variety of sensors, typically implemented as stationary beacons, or statically mounted radio frequency (RF) devices emitting signals for pinpointing receiving devices. However, the uneven distribution of beacons can prevent localization solutions from scaling out and performing consistently across an environment. In one implementation, the capability of many IoT devices (e.g., smartphones, tablets, laptops, wearable devices, sensors, etc.) to transmit and receive, either alternately or simultaneously, RF signals can allow even resource constrained or mobile IoT devices to serve as beacons for use in implementing a localization solution. Indeed, in the case of mobile IoT devices (e.g., devices designed to move or otherwise capable of moving within (or even in and out of) the environment can be utilized as mobile beacons. Such IoT device-implemented beacons can be utilized collaborative to potentially better pinpoint each other device's location through information sharing in machine-to-machine (M2M) interactions.

Collaborative localization can be employed in systems where one or more of the deployed devices are resource-constrained. Collaborative localization can be categorized into classes of augmented state filtering/optimization solutions and belief merging systems, among potentially other examples. In augmented state filtering, locations or trajectories are estimated of a set of target devices in a unified theoretical framework (e.g., augmented state Kalman filtering, augmented state simultaneous localization and mapping (SLAM), structure from motion (SfM), etc.). Such solutions provide a theoretic upper bound and often rely on powerful, centralized processing resources (often offline), which aggregate all device observations (or estimations) to derive localization results. Such resource intensive, centralized solutions, however, typically incur outstanding device-to-device communication overhead in real world collaborative localization scenarios, limiting their utility in IoT and M2M system networks. Belief merging can take, as inputs, a set of location results, instead of the raw sensor data, determined at a local view by a set of devices, where localization conclusions can be derived in a decentralized manner as communication overhead has been largely reduced. Traditional belief-merging solutions, however, do not incorporate 2D geometry without falling back on resource-intensive augmented state formulations (e.g., to formulate locations over time), which themselves may be inefficient in space and time. In implementations described herein, an improved M2M collaborative localization system can be provided that can infer and incorporate 2D encounter geometry without reliance on augmented state formulation.

A system implementing collaborative localization using 2D encounter geometry can represent advancements over other systems that attempt to realize belief merging, but without enforcing geometric constraints. In one implementation, an online algorithm can be applied to a grid based localization scheme (and corresponding algorithm) (e.g., Markov localization, conditional random field (CRF) based localization, etc.). An approximate distance measure can be determined using localization logic local to each of a plurality of devices in an IoT system, and the relative orientations between any pair of the devices can be inferred through 2D geometry for facilitating integration into any grid-based localization algorithms. Further, M2M localization information sharing (e.g., through M2M communications) can enhance the solution, in some cases, allowing IoT devices to share localization determinations with other IoT devices. In some cases, through M2M localization information sharing, resource-constrained IoT devices can leverage information determined by higher-end localization systems present on other IoT devices in the system, or converged location determinations by other IoT devices (e.g., from other resource-constrained devices which have a "head start" in determining their location within a session).

In some implementations, a collaborative localization system employing 2D encounter geometry can include machine executable logic to implement a partially delayed update solution. An approximate relative distance can be determined from beaconing between a pair of devices (e.g., based on detected signal strengths), which can be easily generalized to any RF beaconing technology (e.g., WiFi, ZigBee, ZWave, Bluetooth, Bluetooth Low Energy (BLE), etc.). Some implementations can provide reliable localization results without resorting to additional non-RF functionality, such as active sensors like cameras, microphone array, etc., which maybe unavailable or incompatible with some IoT systems, including systems involving localization of resource-constrained devices, among other examples. Partially delayed update can address instances of localization service latency, for instance, where 2D geometry readings are delayed by insufficient M2M observations being obtained. In some use cases, it can be unacceptable to even temporarily lose track of a device, user, etc., for which localization is being determined. Additionally, in some services, localization latency can degrade the quality of the user experience in related IoT applications and corresponding localization services.

At least some of the above example issues and solutions can be addressed, in the systems, devices, and implementations described herein. For instance, turning to FIG. 2, a system is illustrated, which includes multiple IoT devices, or assets, (e.g., 105a-c) capable of being used in a variety of different IoT applications and supporting collaborative localization within IoT systems deployed using the devices (e.g., 105a-c). For instance, each of the assets 105a-c can be provided with respective location manager logic (e.g., 205, 210, 215) implemented in hardware and software local to the corresponding device. In this example, a location service system 220 can also be provided which can consume location data generated by one or more of the device-based location manager or a management system (not pictured in FIG. 2) interfacing with the location managers in connection with a particular IoT system deployment.

Each of the IoT assets (e.g., 105a-c) can include one or more processing apparatus (e.g., 222, 224, 226), one or more memory elements (e.g., 228, 230, 232), and hardware and/or software implementing one or more logical components. For instance, each asset pictured in FIG. 2 can include a beacon (e.g., 234, 236, 238) for generating a signal to broadcast to other devices (e.g., 105a-c) and receivers in an environment, from which the distance between the device (e.g., 105a) and one or more other devices (e.g., 105b-c) can be derived. The beacon signal can be generated according to one or more different RF signaling technologies (e.g., WiFi, Bluetooth, ZigBee, BLE, etc.). The beacon signal can carry information identifying the corresponding device (e.g., 105a-c) such that receiving devices can determine and track the distance between the devices. A beacon signal, in some cases, can carry additional information and can be used for more substantive wireless communications according to one or more defined communications protocols. A communication module (e.g., 240, 242, 244) can be provided, in some instances, to manage (wireless and even wired) and process data from communications with one or more other systems.

Generally, IoT assets (e.g., 105a-c) can possess unique hardware and other logic (e.g., 110a, 110b, 115a, 246, 248, 250, etc.) to realize the intended functionality of the device. For instance, devices may be provided with such resources as sensors of varying types (e.g., 110a-b), actuators (e.g., 115a) of varying types, energy modules (e.g., batteries, solar cells, etc.), computing resources (e.g., through a respective processor and/or software logic), security features, data storage, and other resources. Further, additional logic (e.g., 246, 248, 250) can be provided through which the respective device (e.g., 105a-c) processes data generated or received by the device, generates communications, controls sensors and actuators of the device, generates outcomes related to the device's function(s), among other functionality.

As noted above, at least a subset of the devices deployed in a given IoT system can possess locally-hosted location management logic (e.g., 205, 210, 215). While some devices (e.g., 105c) may possess GPS (e.g., 225) and other more sophisticated localization modules, other devices (e.g., 105a-b) may be resource-constrained and not possess such functionality. Nonetheless, the wireless communications capabilities of IoT devices can be leveraged to support participation in collaborative localization utilizing 2D encounter geometry. For instance, location managers 205, 210 can include logic to support such collaborative, client-based localization solutions. In one example, a location manager 205, 210 can include a grid manager (e.g., 252, 254), a location estimator (e.g., 256, 258), a step engine (e.g., 260, 262), and 2D encounter engine logic (e.g., 264, 266), among other functionality or combinations of the foregoing. In one example, a grid manager (e.g., 252, 254) can be provided to manage location state for the device in a location grid (e.g., 268, 270), as well as, potentially track the locations determined for other devices encountered in the environment encountered. A location estimator (e.g., 256, 258) can be utilized to derive a starting location, or location probability within the grid (e.g., 268, 270). As the device (e.g., 105a-c), at the beginning of a localization session, may not have encountered any other device (e.g., shortly after power-on), the device (e.g., 105a-c) may begin by attempting to determine its starting location within the environment. Techniques such a RF signal fingerprinting within the environment, or triangulation based on known, fixed RF transmitters in the environment can be used, among other techniques to estimate the starting location of the device. Subsequent encounters with other devices (i.e., beacon signals from other devices) can be used to iteratively improve the location manager's estimate of the device's location within the grid. After a number of encounters and step events (tracked by step engine 260, 262), the location manager can identify a convergence of the device's location within a single one of the cells in the grid, thereby determining the device's location. In other instances, a device can receive location information from another device, which possesses a higher degree of certainty regarding its own position. For instance, device 105c may possess precise location information for its position within the environment using GPS module 225 and can advertise its position to the devices (e.g., 105a-b). Resource-constrained devices (e.g., 105a-b) (or devices without GPS or higher precision localization functionality) can likewise reach definitive judgments regarding their position in the environment (without relying in any way on GPS or other such localization technology) and share their position information with other devices (e.g., in its beacon signal).

A location manager (e.g., 205, 210, 215) can additionally include a step engine 260 configured to determine movement by the device (e.g., 105a-c) and estimate a change in position (tracked within the gird) based on the movement. As an example, a compass, gyroscope, accelerometer, or other functionality can be provided on the device (e.g., 105a-c) and determine that a person or animal carrying the device has taken a step. The general direction of the step can be determined, based on one or more accelerometer readings and the compass reading, and a distance attributable to the step (e.g., a predetermined average distance) can be assumed, from which the change in position can be calculated. Other implementations may determine movement, differently based on the nature of the device. For instance, a drone device that travels autonomously can drive or fly, and the speed of an engine, rotor, or tires can be measured or detected along with directional aspects of the device's movement to determine a change in position from a previously estimated or determined position and the position of the device following the movement.

A location manager (e.g., 205, 210, 215) can also include logic (e.g., 264, 266, 268) for estimating its position or movement within an environment using 2D encounter geometry. The beacon (e.g., 234, 236, 238) can include an antennae to receive signals broadcast by other relatively nearby devices and identify the corresponding broadcasting device from the signals. The 2D encounter engine (e.g., 264, 266) can record encounters (e.g., in encounter records 272) with each of the varied devices in accordance with the received signal. Each encounter record 272 can identify the sending device and also identify the strength, amplitude, or RSSI of the signal. After a number of consecutive encounters within a time window, the 2D encounter engine (e.g., 264, 266) can utilize triangulation or other geometric algorithms to calculate a distance between the receiving and sending devices and derive a position, or change in position, from the distance. Encounter determinations using 2D encounter engine (e.g., 264, 266) can be used in combination with steps or other location change determinations by the location manager 205, 210 (e.g., made by step engine 260, 262, etc.). Encounter-based location change determinations can be used to confirm, supplement, or reinforce the step-based location change determinations of the location manager (e.g., 205, 210). Indeed, after a number of step and encounter position change determinations for a device, it can be expected that the probability that the device is within a particular one of the cells of the location grid 268, 270 will converge to a single cell, or state. Once a threshold level of convergence has been reached for the location of a device, the device, in some instances, may advertise its findings to other devices in the M2M network, or IoT system, to provide context for their 2D encounter determinations based on beacons from the device, among other uses.

In some implementations, some devices (e.g., 105c) may be equipped with GPS or other more formal or sophisticated localization functionality (e.g., 225). These devices can also include a location manager (e.g., 215). Such location managers can be configured to utilize the results of localization functionality 225. Such location managers (e.g., 215), in some implementations, may also possess functionality to support and participate in collaborative localization schemes (e.g., with resource-constrained devices 105a-b), including those implemented at least in part using 2D encounter geometry. For instance, device 105c can send beacon signals for use by other devices (e.g., 105a-b) to determine their respective locations relative to device 105c. In some cases, location managers (e.g., 215) using local GPS or other precision localization results can include much of the same functionality as those with more constrained localization functionality, for instance, to serve as an alternate or fallback localization mechanism for the device (e.g., 105c), such as when the GPS 225 malfunctions, is inoperable or unreliable given the physical environment in which the device operates, among other factors.

Figure 2:
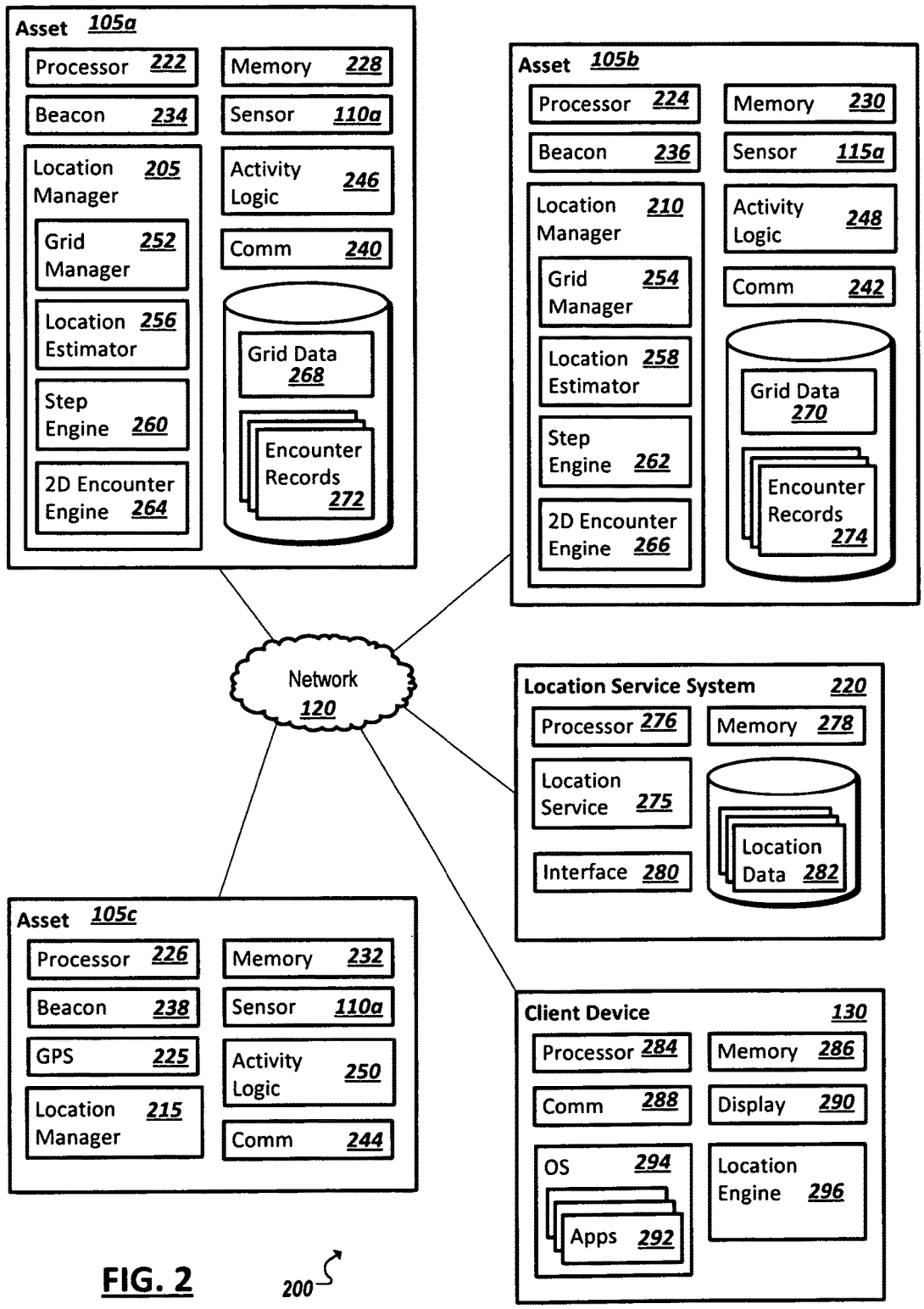
FIG. 2 is a simplified block diagram illustrating example devices with local location manager computing logic.

Continuing with the example of FIG. 2, a location service system 220 can also be provided in some implementations. The location service system 220 can include one or more processors (e.g., 276), one or more memory elements (e.g., 278), and other hardware and software components to host a service (e.g., 275) that utilizes location information of one or more devices (e.g., in location data 282) in an IoT system as an input to the service 275. Such services can include an application that tracks movement of a person, robot, drone, or animal in the environment and utilizes this information to provide a given outcome. A location service examples can include services that pushes recommendations or offers to a user based on their current location, a service that pushes a particular instruction or code to a drone or robot based on its position, a service that provides varying levels of security to a device based on the location in which it is found, a service to provide traffic and traffic route information, among many other potential examples. The location service system 220 can include one or more interfaces (e.g., 280) through which the location service system may communicate with an IoT system. In some cases, the location service system 220 may communicate directly with devices (e.g., 105a-c) to obtain their respective location information (determined locally through collaboration with other devices). In other cases, a device or server, such as that of a management system, can aggregate location determination data from multiple deployed IoT devices (e.g., 105*a-c*) and provide the aggregated location data (e.g., 282) for consumption in the location service 275 (e.g., through a corresponding interface (e.g., 280) on behalf of the devices (e.g., 105*a-c*), among other example implementations.

Client user devices (e.g., 130), such as laptops, desktops, tablets, phablets, smart phones, etc., can also interface with an IoT system utilizing the collaborative localization techniques described herein. In some cases, the client device (e.g., 130) can host one or more applications (e.g., 292) to be run in its operating system (OS) (e.g., 294), which can make use of location information collected from devices (e.g., 105*a-c*) in an IoT system deployment. In still other implementations, a location engine 296 can be provided at client user devices (e.g., 130) to assist in the determination of location of IoT devices (e.g., 105*a-c*) within proximity of the user device 130. For instance, location engine 296 can generate a beacon signal and advertise its position to other IoT devices (e.g., 105*a-b*) to assist location managers (e.g., 205, 210, 215) determine location. Alternatively, client device 130 can be considered a mobile IoT asset itself and its location engine 296 can both assist other devices in the environment through encounter events, as well as use these encounters to determine or reinforce determination of its own location, among other examples. In some cases, a client device (e.g., 130) can include one or more processors (e.g., 284), one or more memory elements (e.g., 286), and a communications module (e.g., 288), through which the device can communicate with other devices in a network. In one example, the user device 130 can enable user interface (to be presented on display 290) to allow a user to manage settings, configuration, and other aspects of an IoT deployment. Further, display 290 can be used to present graphical user interfaces (GUIs) configured to represent positioning and movement of various IoT devices or to serve as a GUI of a location-based service (e.g., 220) or locally-hosted application (e.g., 292) which makes use of the IoT localization information (e.g., determined by instances of a location manager (e.g., 205, 210), among other examples. For instance, a map can be presented in such GUI examples and an icon or other graphical element can be configured to move about the map to correspond to determined position and movement of one or more devices (including the client device itself) within an environment utilizing the 2D encountering solution, among other examples.

Figure 3:
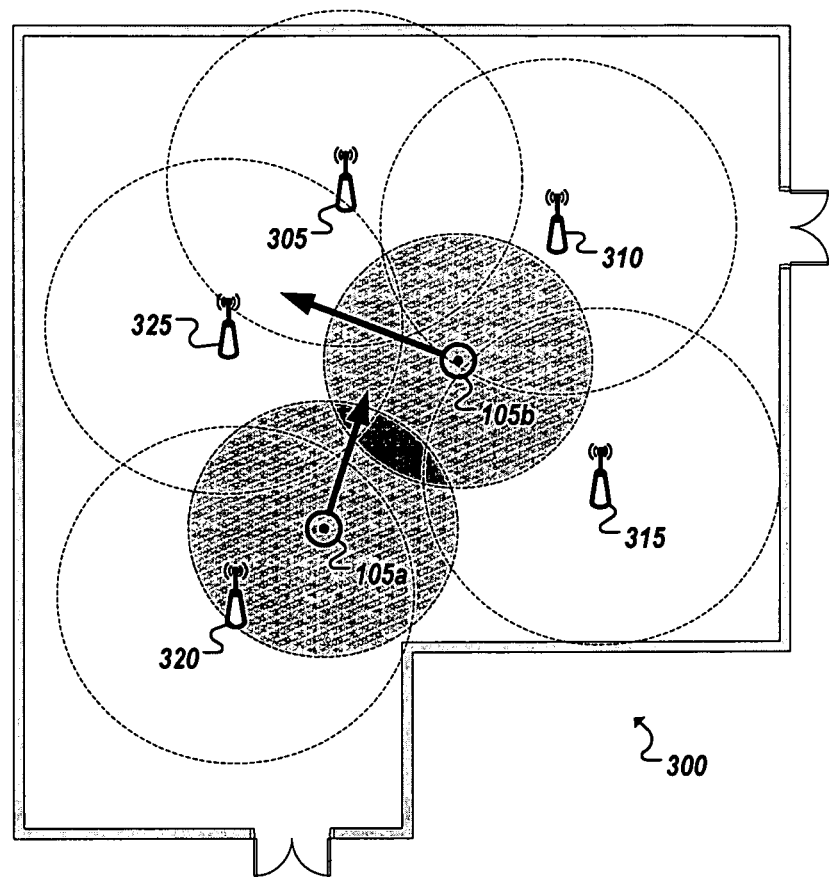
FIG. 3 is a block diagram illustrating an overhead view (or floorplan) of an example environment in which an M2M network can be deployed.

Turning to FIG. 3, an above view, or floorplan 300, of an example environment is shown, in which an example IoT system can be deployed. In this example, at least two IoT devices (e.g., 105*a-b*) have been deployed, each capable of broadcasting a beacon signal and further including logic to determine, from the other device's beacon, a distance from the other device. Each device can further determine its location in the 2D floorplan based on the distance determined from the other device's beacon. Each of the devices (e.g., 105*a-b*) may move within the environment. Sometimes only one of the devices may be moving, at other times both devices may be moving simultaneously within the environment 300.

In some implementations, other communications devices (e.g., 310, 315, 320, 325) may also be present within the environment, such as fixed or otherwise statically located devices equipped with RF transmitters that may emit signals within the environment. In some implementations, example IoT devices (e.g., 105*a-b*) can utilize RF signals from statically located transmitters (e.g., 310, 315, 320, 325) to derive an initial estimate of the device's location within the environment. For example, a location manager of the device may detect the strengths of the fixed signals to determine a distance from the fixed transmitters (e.g., 310, 315, 320, 325) and the device. From this reading, and a knowledge of the location of the transmitters (e.g., 310, 315, 320, 325), the device (e.g., 105*a-b*) may estimate its initial position within the environment 300. In another example, fingerprinting can be utilized based on the mix of RF signals broadcast by the collection of transmitters (e.g., 310, 315, 320, 325) to estimate the device's initial position within the environment 300, among other localization techniques.

The initial location estimate for a device (e.g., 105*a-b*) may determine an array of probabilities that the device is in a respective one of cells of a location grid corresponding to the environment 300. In some instances, the initial estimate may provide a relatively low level of convergence, with multiple different grid cells indicating a relatively high probability that the device is present in the cell. A first movement step of the device can reference the initial estimate and the change in location can be based on a corresponding movement away from the initial location. Further, as the devices 105*a-b* move about the environment 300, they may encounter the beacon signals of the other device and determine a distance between the devices (e.g., 105*a-b*) at the encounter based on the beacon signal. These encounters can be used with the detected step (or other movements) to cause the device to narrow the variance of the grid probability array to eventually converge the location estimation to a single grid cell.

Figure 4:
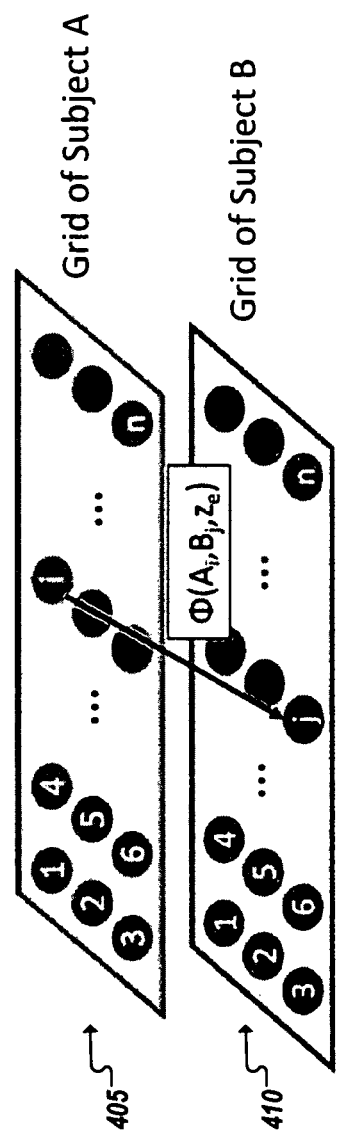
FIG. 4 is a simplified block diagram illustrating representations of grids in a gird-based localization system.

As noted above, locally hosted location manager logic can employ grid-based localization, easy hardware implementation and acceleration for resource-constrained and other IoT devices. The location manager can utilize potentially any grid-based localization algorithms. In some implementations, location managers can collaborate with the location managers of other devices to perform grid merging (or element-wise multiplication as every grid cell represents a respective probability). For instance, when two devices (e.g., 105*a-b*) are in the same geographic area, or environment, at a particular time, the location estimate for each device can be represented locally in grid-based notation. As represented in FIG. 4, each device can host data representing the corresponding location grid (e.g., 405, 410) of the device (e.g., 105*a-b*, or "Subject A" and "Subject B"). Probability distributions within the grid can be estimated separately by each location manager for each device within the corresponding grid data structure. However, in some implementations, devices encountering each other within the environment can communicate (e.g., using beacon signals) to incorporate encounter constraints within their respective probabilities. In some cases, when a device detects a signal from another device above a threshold RSSI or strength, the device can begin tracking the encounter to attempt to determine the device's position relative to the other device. From this information, both devices can improve the speed at which they arrive at a definitive determination of their own location within the grid.

In one implementation, location managers can model encounter based on a function φ describing the relation between the probability distributions in the two grids. The potential function $\phi(S_i^A, S_j^B, z_e)$, can indicate how strong the evidence of the encounter event $z_e$ is for which the subject (or device) A and B are at states $S_i^A$ and $S_j^B$ when encountering in a proximity at an arbitrary distance (where i is the time step of device A relative to the device A's starting time stamp and j is the time step of device B relative to the device B's starting time stamp). The probability distribution can be manifest by the following model:

$$\forall\, b \in S^B,\ P'(b) = P(b) * P(a') * \phi(a', b, z_e)$$

where $$a' = \underset{\forall a \in S^A}{\mathrm{argmax}}\, \phi(a, b, z_e)$$

For any encounter, the respective location manager can determine two component measures, distance and direction. An encounter event can be detected by the devices that support short-range wireless protocols such as BLE. The value of the received signal strength indicator (RSSI) can be used (e.g., by the device's local location manager logic) to estimate the distance between the encounter subjects, for instance, according to:

$$\mathrm{RSSI[dbm]} = -(10n \log_{10} d_{rssi} - A)$$

Figure 5:
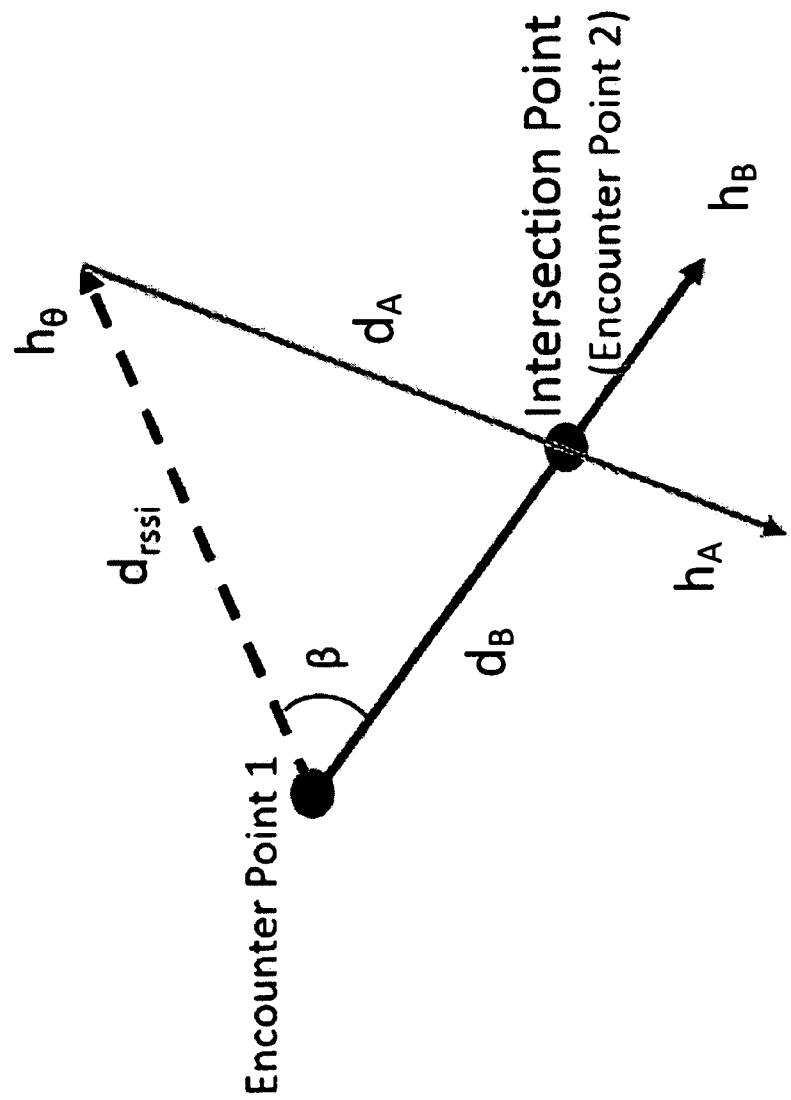
FIG. 5 illustrates an example of localization of a device based on two dimensional encounters with other devices within a system.

As many wireless communication antennas in IoT systems are omnidirectional (particularly in resource-constrained devices), confirming the direction of the encounter subject can be problematic. Indeed, from a single received beacon signal, the location manager may only be able to detect that the encounter subject is somewhere within the range $d_{rssi}$ of the received omnidirectional signal (e.g., as indicated by the RSSI), without knowing from which direction. In some implementations, a location manager can possess logic to determine, from multiple received signals from the subject device (when one or both of the receiving device and transmitting device are moving within the environment), the intersection of the two devices (such as represented in FIG. 5). In some implementations, three or more received signals can allow an intersection point to be identified. For instance, given that the relative distances and angles at the first and last encounters can be detected, all other distances to the intersection point (from each other encounter (before or after the intersection) involving the two subjects) can be determined. The intersection point can represent the encounter point with the least relative distance between two subjects (e.g., when the two devices are assumed to be in the same state (i.e., grid cell) at that time). Upon determining the intersection point, an angle β can be calculated (e.g., by the cosine theorem), where the $d_A$ and $d_B$ are estimated by the moving distance of each subject through any self-localization (or step-based) algorithms. Accordingly, a value $h_\theta$ can be determined representing the moving direction $h_B$ rotated by angle β (as represented in FIG. 5).

As noted above, in order to take advantage of the contribution of encounter information derived from signals detected from other devices within an environment, multiple signals are to be detected within a particular window such that a directionality of the signals can be determined. In one example, at least three encounters are to be detected from a single device within a particular time window in order to derive location information from the encounters. As illustrated in FIG. 6A, steps (or other non-M2M location change information) can be detected while M2M encounter signals of other devices are being detected. A location manager can make use of both non-M2M and M2M location information to update the location, or state, of the device within its grid. In the case of 2D encounter geometry, a delayed update may result, as shown in FIG. 6A, if the location manager waits to update state until a sufficient number of encounters (e.g., 605, 610, 615) are detected from a single device. For instance, the location manager of a particular device may not be able to derive any meaningful state updates from one or two encounters (e.g., 605, 610) and will wait until a third encounter occurs before updating the state. However, as illustrated in FIG. 6A, delaying the update until sufficient context for the encounters is received can lead to a latency $t_a$, where consideration of intervening steps (or other non-M2M) movements (e.g., 620, 625, 630, 635, 640) are queued until a preceding encounter is resolved (by collecting subsequent encounters 610, 615). For instance, in the example of FIG. 6A, location updates are delayed until a third encounter 615 is received, upon which time the updates corresponding to previous encounters (e.g., 605, 610) and steps (e.g., 620, 625, 630, 635, 640) can also be applied (at 645 following the observation of encounter 615).

In one implementation, to improve upon the latency introduced by a delayed update of state due to the consideration of M2M encounter information, an alternative example location manager can apply a partially delayed update to location information detected using the location manager. For instance, a partially delayed update can cause state updates based on non-M2M observations (e.g., steps 620, 625, 630, 635, 640) to be processed in order (temporally) as they are detected (i.e., with no delay to the state update), while M2M observations updates (e.g., encounters 605, 610, 615) are incorporated out of order (temporally). This can allow each device's location manager, within a collaborative localization system, to continuously estimate the location of its device based on non-M2M observation while still opportunistically incorporating M2M information on the fly using 2D geometric constraints. Such an approach can dramatically improve latency ($t_b \lll t_a$) as would be experienced through a full delayed update.

Figure 6B:
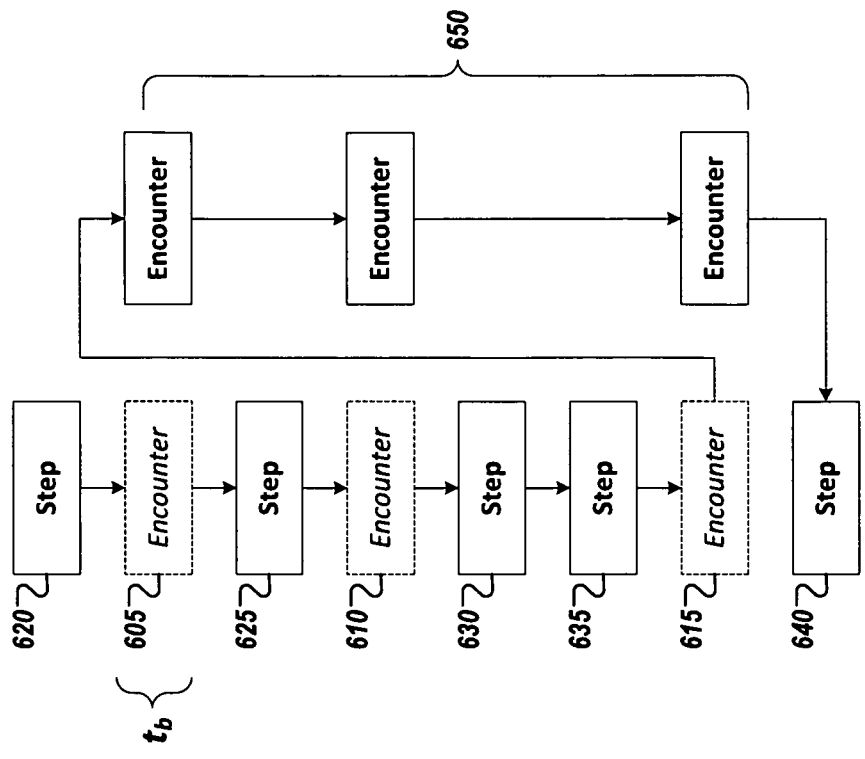
FIGS. 6A-6B are flowcharts illustrating example techniques for determining location of a device.
Figure 6A:
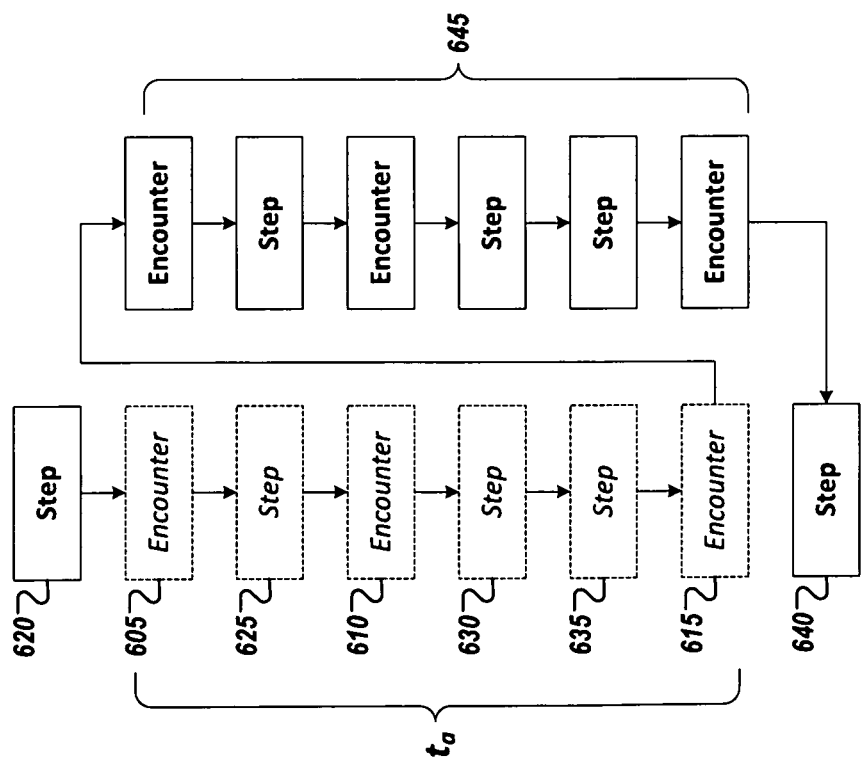

For instance, as shown in FIG. 6B, while a first step 620 (at time=t) may be succeeded by an encounter 605 (at t+1), followed by another step 625 detection (at t+2), and so forth. The first encounter 605, in accordance with partially delayed update, can be queued for later consideration (at 645) (i.e., resulting no immediate state update), while location information obtained in step 625 results in an immediate grid state update based on the step 625 information (effectively ignoring encounter 605). For instance, steps (e.g., 620, 625, 630, 635) can include non-M2M observations detected locally at the device from internal measurement mechanisms, such as accelerometers, compasses, gyroscopes, etc. and identify an assumed distance and direction associated with each step (e.g., 620, 625, 630, 635, 640). In one example, each step (e.g., 620, 625, 630, 635, 640) can be detected and determined to correlate to a human step. Accordingly, the direction of the step and an assumed distance (e.g., the distance of an average human step (e.g., for a particular user of a particular height)) can be estimated to define the dimensions of a location state change from a previous location (as recorded in grid data) corresponding to the step (e.g., 620, 625, 630, 635, 640). As a result, due to the step, the current location of the device, as defined in the grid, can be updated to account for the dimensions of the step.

Continuing with the example of FIG. 6B, another encounter 610 (e.g., with a particular device (or more accurately a signal sent from the particular device) can be detected, followed by (in this particular example) two more non-M2M steps (e.g., 620, 625, 630, 635, 640) before a third M2M encounter 615 is received. In this example, the location manager can automatically update the device's location status based on each of the steps 630, 635 as they are detected, adding the second encounter 610 to the queue until the third (e.g., the minimum threshold) encounter 615 is detected (at time t+6). Following the detection of the third encounter 615, a location determination can be made (at 650) based on information gleaned in the third encounter 615 within the context of the information gleaned (and stored in the queue) for each of the first (605) and second (610) encounters. Accordingly, upon detection of the three encounters, another update can be made to the device's location grid status, this time based on the encounter information, thereby supplementing and enriching the contributions of the foregoing step-based state updates (e.g., at 620, 625, 630, 635). With the location state updated at time t+6 (based on encounters 605, 610, 615), a subsequent step (e.g., 640), or encounter, can cause an additional update to be made to the grid status. Indeed, once a minimum number of encounters with a particular device in a particular time window or sequence (e.g., three encounters) have been detected, each additional encounter with the particular device can be used to immediately generate another location grid state update. For instance, were a fourth encounter (not shown) with the other device be received following encounter 615, location of the receiving device could be derived using at least encounters 610 and 615, and so on. Indeed, the queue can store information from all or a minimum threshold number of previous encounters (e.g., two previous encounters) with a particular device within a particular time window, and the queue of previous encounter information can be referenced to determine location updates as subsequent encounters are detected. In one implementation, an encounter record can be created for each unique detected sequence of encounters with a given device and the encounter record can be maintained until the encountered device falls out of range of the detecting device, among other implementations. This can represent another example advantage over full updates where not only encounters, but also steps, are to be queued, while waiting for a minimum number of encounters (such as in the example of FIG. 6A).

As noted, in order to take into account 2D encounter geometry (with relative distances and orientations), a sufficient number of M2M (encounter) observations are to be first obtained. As step events (or other non-M2M movement detections) are encountered, the probabilities of grid states can be transferred by the step events while waiting for encounter-based localization information to develop (e.g., to detect a minimum number of encounter instances with a particular other device. Accordingly, a model can be modified, where $a_{lost}$ is the relative encounter point in $S^A$ of b in $S^B$ that is estimated by the last encounter event (where $a_{last}$ is the last time step at which device B encounters device A, $S^A$ is the (grid) state of device A, $S^B$ is the state of device B, and b is the corresponding location of device B), and:

$$\forall b \in S^B, P'(b) = P(b) * P(a'_{last}) * \phi(a'_{last}, b, z_e)$$

where $$a'_{last} = \underset{\forall a \in S^A}{\mathrm{argmax}}\ \phi(a, b, z_e^{last})$$

$$\phi(S_i^A, S_j^B, z_e) = f_\theta + f_d$$

Here, the potential function $\phi$ is related to the direction $h_\theta$ and the distance $d_{rssi}$. It can be defined as a function that is composed of two feature functions ($f_\theta$ and $f_d$) as shown. Additionally, taking measurement errors into consideration, the direction and the distance can be represented (e.g. by location manager logic) as a log-normal distribution. Therefore, the feature functions can be defined:

$$f_\theta(S_i^A, S_j^B, z_\theta) = \ln\frac{1}{\sigma_\theta\sqrt{2\pi}} - \frac{(z_\theta - \theta(S_i^A, S_j^B))^2}{2\sigma_\theta^2}$$

$$f_d(S_i^A, S_j^B, z_d) = \ln\frac{1}{\sigma_d\sqrt{2\pi}} - \frac{(z_d - D(S_i^A, S_j^B))^2}{2\sigma_d^2}$$

where the $\theta(S_i^A, S_j^B)$ and the $D(S_i^A, S_j^B)$ are estimated according to the floor plan.

In some implementations, in order to reduce time complexity, states falling outside of the encounter range (or outside the finite space tracked by the device's respective location grid) can be ignored. For instance, we can limit the encounter range within a predefined range distance (e.g., 5 meters) and build a look-up table to restore the valid encounter neighbors of each state in advance. With the range of encounters constrained by the dimensions of the grid, the relative probabilities can be calculated beforehand to reduce the computational overhead at runtime. By doing so, the time complexity can be reduced from $O(n^2)$ to $O(n)$ (where n is the number of grids) indicating that the time complexity increases asymptotically linearly with the number of grid cells. Overall, an encounter model can be formulated by:

$$\forall b \in S^B, P'(b) = P(b) * P(a'_{last}) * \phi(a'_{last}, b, z_e)$$

where $$a'_{last} = \underset{\forall a \in \text{encounter neighbors of } b \text{ in } S^A}{\mathrm{argmax}}\ \phi(a, b, z_e^{last})$$

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 7A:
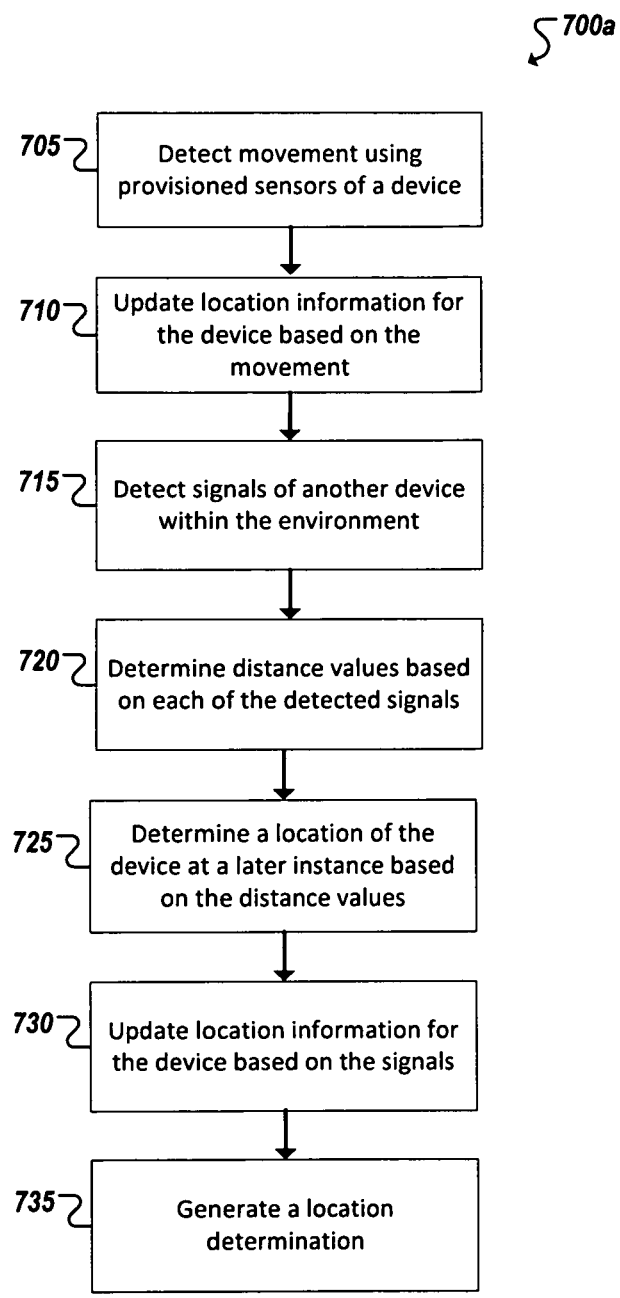
FIGS. 7A-7B are flowcharts illustrating additional example techniques for determining location of a device.

FIG. 7A is a simplified flowchart 700a illustrating an example technique for determining a location locally at a device using a combination of a both non-M2M (e.g., steps) and M2M (e.g., encounter) observations. For instance, steps, or other movements, can be detected 705 at a first device based on one or more movement or directional sensors provisioned (internally or externally) on the first device. A location of the first device within a particular environment can be estimated from the detected movement (and can reflect a relative distance estimated from a prior estimated location of the first device). Location information (such as location grid states or probabilities) can be updated 710 to reflect the location estimation based on the detected movement. Signals from other devices within the environment can be detected 715 and also used to improve the location estimates of the first device. For instance, a sequence of signals from a second device can be detected 715. Detection of a first of the detected sequence of signals can precede detection (at 705) of the movement. While the detected movement can lead to an immediate update (710) of the location information, information and results generated from the first signal in the sequence can be queued, or temporally delayed, until a requisite number of signals are detected in the sequence. Each of the signals in the sequence can be used to determine 720 a respective measurement of the distance between the first and second devices at the time the second device sent the corresponding signal. These determined distances can serve as the basis for a location estimation for the first device. Indeed, a location of the first device can be determined 725 from the distances once a threshold number of signals have been received, and the location information can be updated 730 to reflect the estimate.

While intervening movements detected from local sensors of the first device may lead to corresponding updates of the location information for the first device, contributions from encounters (evidenced by received sequences of signals) can be delayed until a threshold number of signals are received for any one device. Due to the immediate updating of location information based on locally-detected movements (e.g., 705, 710), there may be no latency experienced (e.g., by a user) in the location estimates generated for the first device, at least as it pertains to location changes predicated on the locally-detected movements. Further, after a set of detected movements (e.g., non-M2M observations) interspersed between M2M encounter observations (e.g., detected signal sequences (715)), the first device may make a location determination 735 indicating that the first device has determined, beyond a threshold probability, that the first device is currently within a particular location (e.g., a particular cell of a location grid). Such location determination (and even location estimates) can be shared (through wireless signaling) with other devices in the environment to improve their own location estimates. Further location determinations (e.g., from 735) can be shared with other systems, such as servers of location-based services or an IoT management system to manage a system of moving devices, among other example uses.

Figure 7B:
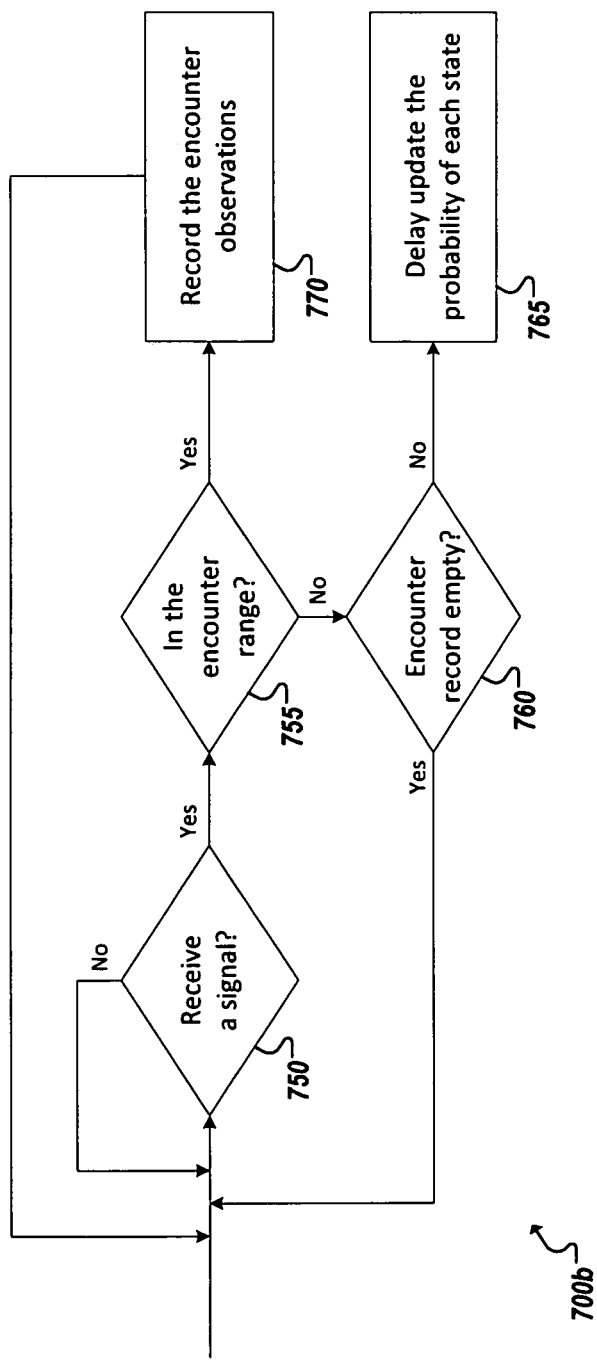

Turning to FIG. 7B, a flowchart 700*b* illustrates an example merging (involving encounter-based localization) and managing encounter records in a localization system employing 2D encounter geometry. In determining whether to create, maintain, or discard an encounter record, an IoT device can receive a signal 750. Indeed, the device may receive multiple signals from multiple different devices and create concurrent encounter records for each encounter (and make corresponding determinations regarding its location (in a grid) from the encounters. A device identifier can be determined from each of the received signals. Further, the strength of each received signal can be detected to determine 755 whether the device is within a defined encounter range (e.g., in sufficient physical proximity) of the receiving device. This allows a potentially large portion of the received signals to be filtered-out, leaving only the signals of beaconing devices within closest proximity to the device to be assessed. If a signal is determined to fall outside of the defined range (e.g., a particular RSSI value or physical distance value inferred from RSSI values, etc.), the location manager can determine (at 760) whether an active encounter record exists for the identified transmitting device. If no active encounter record exists, the signal can be ignored. If an encounter does exist however, updates to the location state based on the signal can be delayed 765 (e.g., until sufficient encounter readings have been obtained to allow for an encounter-based localization estimate (e.g., as in FIG. 6B)). If the signal is determined (at 755) to be within the defined encounter range, an active encounter record can be created for the encounter if one has not already been created, and information concerning the corresponding signal from the encountered device can be recorded 770 within the record. If insufficient subsequent encounters are detected, or if the location manager is otherwise unable to determine an intersection point between the encountered device and receiving device, the encounter record can be abandoned. Likewise, encounter records can be dropped if a given device move outside of the encounter range (e.g., for a threshold amount of time or unit intervals). Should this same device back into the encounter range after the abandonment of a previous encounter record, a new active encounter record can be generated. In either instance, an active encounter record can be used to track each of the encounters in a sequence of encounters with a device to allow 2D location information to be generated based on the encounter information, such as discussed herein.

Figure 8:
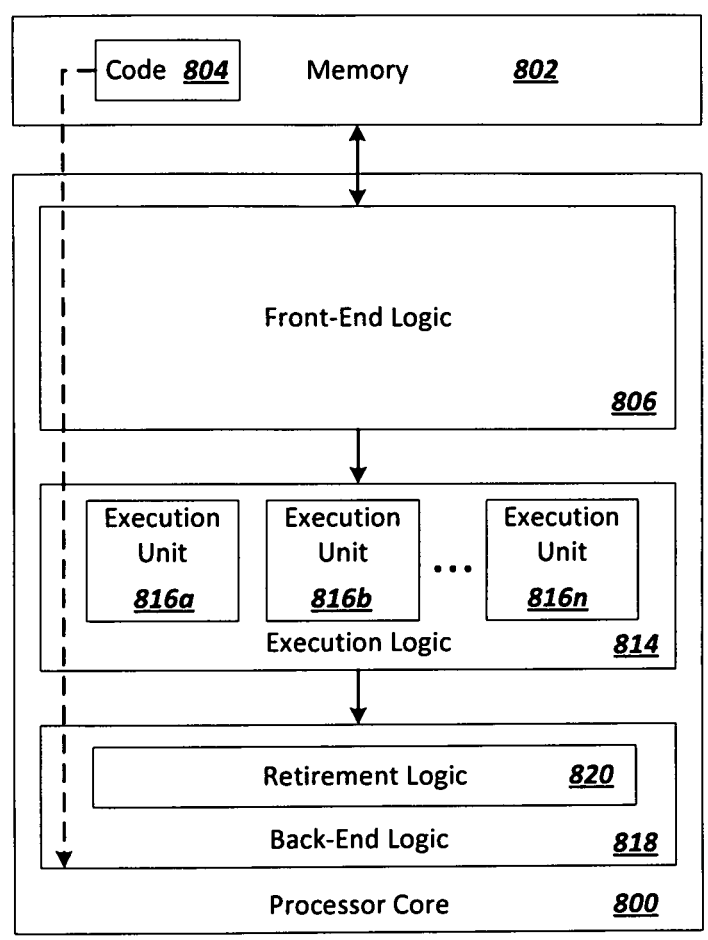
FIG. 8 is a block diagram of an exemplary processor in accordance with one embodiment.
Figure 9:
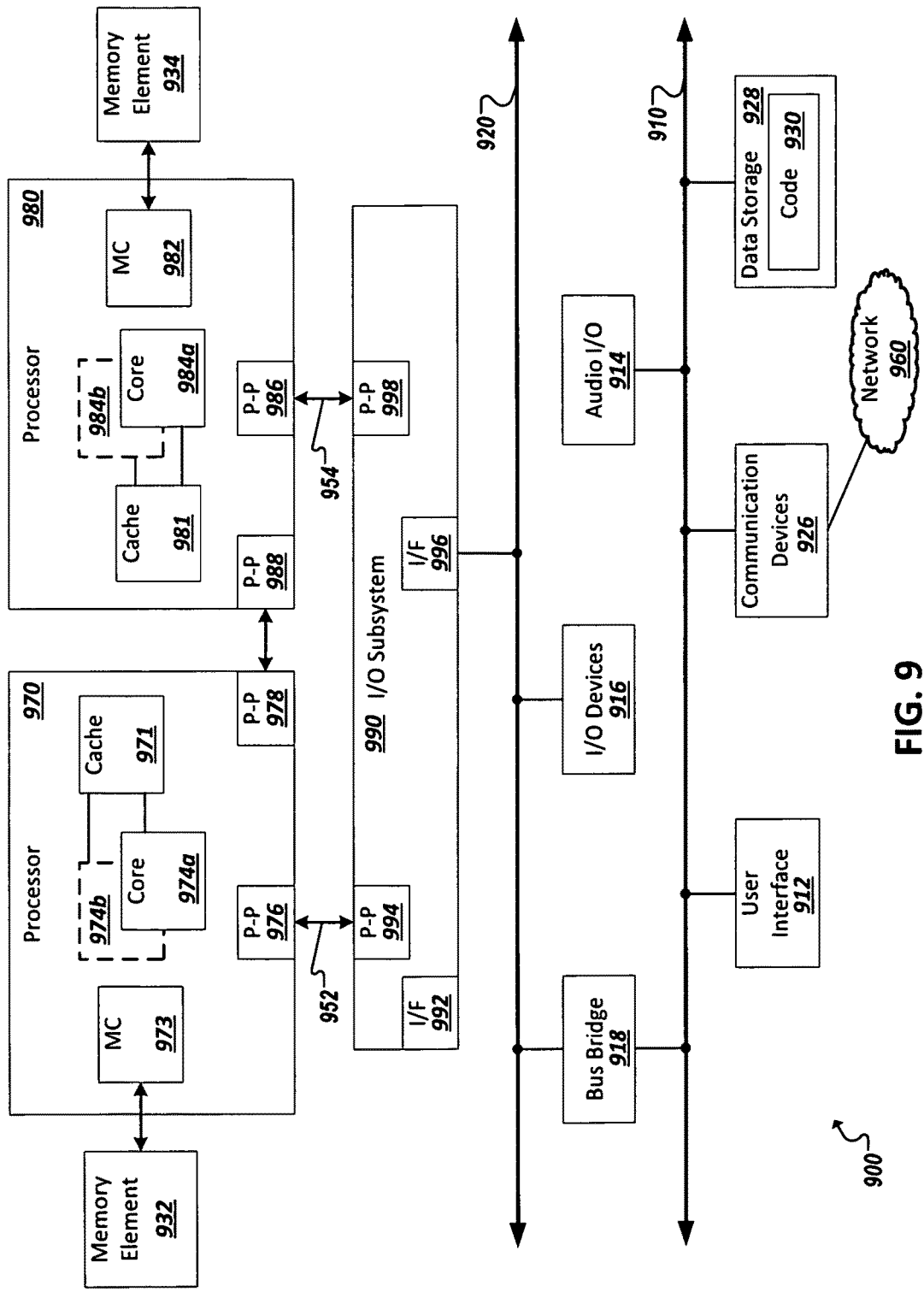
FIG. 9 is a block diagram of an exemplary computing system in accordance with one embodiment.

FIGS. 8-9 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium with executable code to detect, using sensors provisioned on a first device, a movement of the first device, wherein the movement causes the first device to change position within an environment, update location information for the first device based on the position change, detect, at the first device, a plurality of signals from a second device in the environment, determine, for each of the plurality of signals, a distance between the first and second devices when the respective signal was sent by the second device, determine, from the plurality of signals, another change in position of the first device within the environment, and update location information for the first device based on the other change in position. The movement can be detected at the first device at an instance between two of the plurality of signals, and location information for the first device based on the first position change can be updated prior to detection of the later of the two signals in the plurality of signals.

In one example, the other change is determined in response to detecting that a particular one of the plurality of signals from the second device exceeds a minimum threshold amount.

In one example, the minimum threshold amount corresponds to a minimum number of distances between the first and second devices, determined from the plurality of signals, required to determine a location of the first device from the distances.

In one example, data describing signals preceding the particular signal are queued at least until detection of the particular signal.

In one example, updating the location information comprises updating states within a location grid corresponding to the environment.

In one example, updating the location information comprises determining, for each of a plurality of cells of the location grid, a probability that the first device is present in the cell based on a respective location estimate by of the first device.

In one example, the first device generates a location estimate corresponding to each of the first and second changes in position.

In one example, a particular device identifier is identified in each of the plurality of signals to attribute the plurality of signals to the second device.

In one example, at least one other signal from a third device in the environment is detected to determine, from the other signal, whether the third device is within a threshold distance of the first device.

In one example, an encounter record can be generated for the third device to track encounters with the third device based on the third device being within the threshold distance.

In one example, the encounter record for the third device can be discarded based on determining that the distance between the first and third devices has grown beyond the threshold distance.

In one example, signals can be transmitted within the environment, wherein the transmitted signals are usable by other devices in the environment to identify their respective locations within the environment.

In one example, at least some of the transmitted signals advertise a determined location of the first device.

In one example, the determined location is based at least in part on the updates to the location information based on the movement and the plurality of signals from the second device.

In one example, an initial location of the first device within the environment is estimated.

In one example, estimating the initial location comprises detecting signals from a plurality of stationary transmitters with known locations in the environment and generating the estimate based at least in part on detected strengths of the signals of the stationary transmitters while the first device is in the initial location.

In one example, estimating the initial location comprises determining a radio frequency fingerprint and identifying a particular location within the environment associated with the fingerprint.

One or more embodiments may provide an apparatus (and system including the apparatus), where the apparatus includes at least one processor, computer memory, at least one antenna to receive and transmit radio frequency signals, at least one movement sensor to detect movement of the apparatus, at least one direction sensor to detect orientation of the apparatus, and a location manager. The location manager can be executable by the processor to detect, using the movement and direction sensors, a change in position of the apparatus within an environment, update location information based on the position change, detect, using the antenna, a sequence of signals from a particular device in the environment, determine, for each of the sequence of signals, a distance between the apparatus and the particular corresponding to instances when each respective signal was sent by the particular device, determine, from the plurality of signals, another change in position of the apparatus within the environment, and update the location information based on the other change in position. The movement can be detected at an instance between two of the sequence of signals, and location information corresponding to the first position change can be updated prior to detection of the later of the two signals in the sequence of signals.

In one example, the memory stores location grid data corresponding to the environment, and updating the location information includes updating state within the location grid data.

In one example, the memory stores a plurality of encounter records, each of the encounter records corresponds to a respective sequence of signals received at the antenna from a corresponding one of a plurality of other devices in the environment, and each encounter record identifies the respective sequence of signals as detected at the apparatus.

In one example, the apparatus further includes at least one of a sensor to sense attributes of the environment or an actuator to cause an action within the environment.

In one example, the apparatus further includes a motor to drive automatic movement of the apparatus within the environment.

In one example, the apparatus further includes one of a wearable device, a personal computing device, and a drone device.

In one example, a system may also include a server to host location-based services based on the location information.

In one example, a system may also include the other device.

In one example, the device and other device are deployed to interoperate in a machine-to-machine network.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one machine accessible storage medium having code stored thereon, the code when executed on a machine, causes the machine to:
   detect, using movement sensors provisioned on a first device, a movement of the first device, wherein the movement causes the first device to change position within an environment;
   update location information for the first device based on the movement to identify the first device at a first location within the environment;
   detect, at the first device, a sequence of signals from a second device in the environment over a span of time;
   determine, for each of the sequence of signals, a respective distance between the first and second devices corresponding to a respective instance in the span of time when the respective signal was sent by the second device, wherein the determined distances comprise a plurality of distances corresponding to the sequence of signals, and at least one of the sequence of signals is received prior to determining the movement;
   determine that the number of determined distances in the plurality of distances exceeds a particular number needed to derive the location of the first device from the plurality of distances;
   derive an updated location of the first device from the plurality of distances based on determining that the number of determined distances exceeds the particular number, wherein the updated location is based on the movement and the number of determined distances; and
   update location for the first device to reflect the updated location in the environment.

2. The storage medium of 1, wherein the instructions, when executed, further cause the machine to retroactively determine respective changes in location within the environment corresponding to each one of the plurality of distances after determining a last one of the determined distances in the number of determined distances.

3. The storage medium of claim 1, wherein updating the location information comprises updating states within a location grid corresponding to the environment.

4. The storage medium of claim 3, wherein updating the location information comprises determining, for each of a plurality of cells of the location grid, a probability that the first device is present in the cell based on a respective location estimate by of the first device.

5. The storage medium of claim 4, wherein the first device generates a location estimate corresponding to each of the first and second changes in position.

6. The storage medium of claim 1, wherein the instructions, when executed, further cause the machine to identify a particular device identifier in each of the plurality of signals to attribute the plurality of signals to the second device.

7. The storage medium of claim 6, wherein the instructions, when executed, further cause the machine to detect at least one other signal from a third device in the environment and determine, from the other signal, if the third device is within a threshold distance of the first device.

8. The storage medium of claim 7, wherein the instructions, when executed, further cause the machine to generate an encounter record for the third device to track encounters with the third device based on the third device being within the threshold distance.

9. The storage medium of claim 8, wherein the instructions, when executed, further cause the machine to discard the encounter record for the third device based on determining that the distance between the first and third devices has grown beyond the threshold distance.

10. The storage medium of claim 1, wherein the instructions, when executed, further cause the machine to transmit signals within the environment, wherein the transmitted signals are usable by other devices in the environment to identify their respective locations within the environment.

11. The storage medium of claim 10, wherein at least some of the transmitted signals advertise a determined location of the first device.

12. The storage medium of claim 11, wherein the determined location is based at least in part on the updates to the location information based on the movement and the plurality of signals from the second device.

13. The storage medium of claim 1, wherein the instructions, when executed, further cause the machine to estimate an initial location of the first device within the environment.

14. The storage medium of claim 13, wherein estimating the initial location comprises detecting signals from a plurality of stationary transmitters with known locations in the environment and generating the estimate based at least in part on detected strengths of the signals of the stationary transmitters while the first device is in the initial location.

15. The storage medium of claim 13, wherein estimating the initial location comprises determining a radio frequency fingerprint and identifying a particular location within the environment associated with the fingerprint.

16. An apparatus comprising:
   at least one processor;
   computer memory;
   at least one antenna to receive and transmit radio frequency signals;
   at least one movement sensor to detect movement of the apparatus;
   at least one direction sensor to detect orientation of the apparatus;
   a location manager, executable by the processor to:
     detect, using the movement and direction sensors, a change in position of the apparatus within an environment;
     update location information based on the change in position to identify the apparatus at a first location within the environment;
     detect, using the antenna, a sequence of signals from a particular device in the environment in a span of time;
     determine, for each of the sequence of signals, a respective distance between the apparatus and the particular device each corresponding to a respective instance in the span of time when the respective signal was sent by the particular device, wherein the determined distances comprise a plurality of distances corresponding to the sequence of signals, and at least one of the sequence of signals is received prior to determining the change in position;

determine that the number of determined distances in the plurality of distances exceeds a particular number needed to derive the location of the apparatus from the plurality of distances;

derive an updated location of the apparatus from the plurality of distances based on determining that the number of determined distances exceeds the particular number, wherein the updated location is based on the determine change in position and the number of determined distances; and update the location information to reflect the updated location in the environment, wherein the first location and the updated location comprise different location with a two-dimensional plane.

17. The apparatus of claim 16, wherein the memory stores location grid data corresponding to the environment, and updating the location information comprises updating state within the location grid data.

18. The apparatus of claim 16, wherein the memory stores a plurality of encounter records, each of the encounter records corresponds to a respective sequence of signals received at the antenna from a corresponding one of a plurality of other devices in the environment, and each encounter record identifies the respective sequence of signals as detected at the apparatus.

19. The apparatus of claim 16, further comprising at least one of a sensor to sense attributes of the environment or an actuator to cause an action within the environment.

20. The apparatus of claim 16, further comprising a motor to drive automatic movement of the apparatus within the environment.

21. The apparatus of claim 16, wherein the apparatus comprises one of a wearable device, a personal computing device, and a drone device.

22. A system comprising:
a device comprising:
  at least one processor;
  computer memory; and
  a location manager, executable by the processor to:
    estimate, at a particular instance, location of the device within an environment based on movements of the device detected from sensors provisioned on the device;
    update location information for the device based on location estimated for the particular instance;
    detect, at the device, a sequence of signals from another device in the environment;
    determine, for each of the sequence of signals, a respective distance between the device and the other device when the respective signal was sent by the other device, wherein the determined distances comprise a plurality of distances corresponding to the sequence of signals, and at least one of the sequence of signals is received prior to determining the movement;
    determine that the number of determined distances in the plurality of distances exceeds a particular number needed to derive the location of the first device from the plurality of distances;
    derive an updated location of the device from the plurality of distances based on determining that the number of determined distances exceeds the particular number, wherein the updated location is based on the location estimated for the particular instance and the number of determined distances; and
    update the location information for the device to reflect the updated location in the environment.

23. The system of claim 22, wherein the device and other device are deployed to interoperate in an Internet of Things (IoT) system.

* * * * *